June 23, 1970     R. C. BAENZIGER     3,516,191
FISHING FEEL WHEEL
Filed Aug. 1, 1968     2 Sheets-Sheet 1
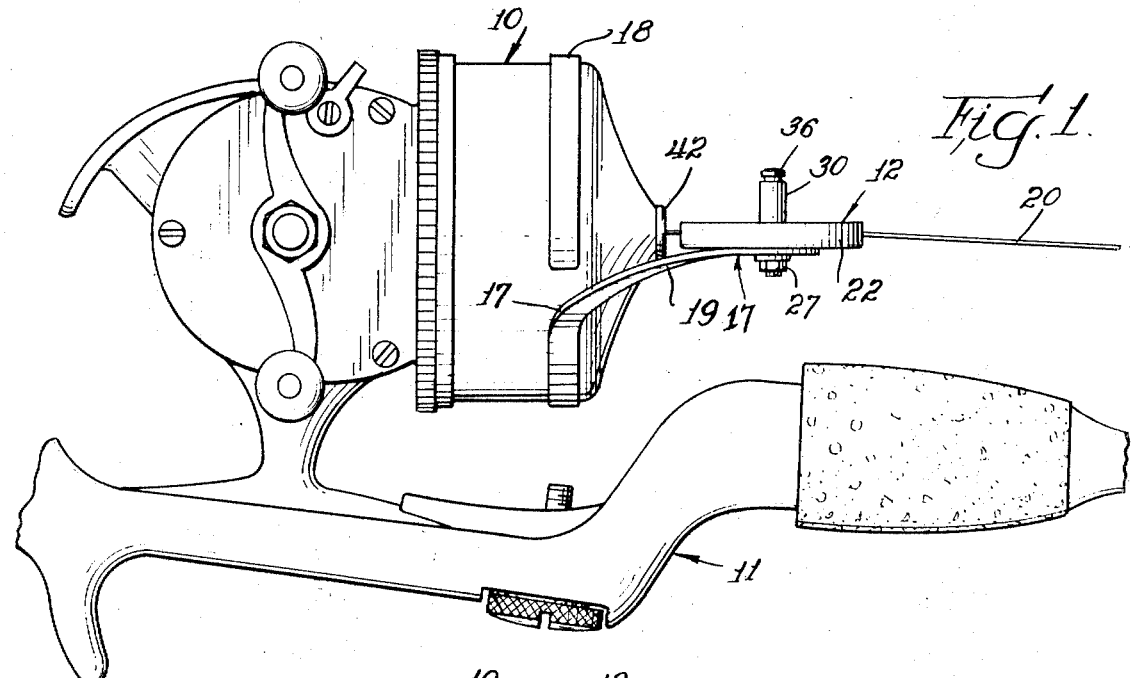
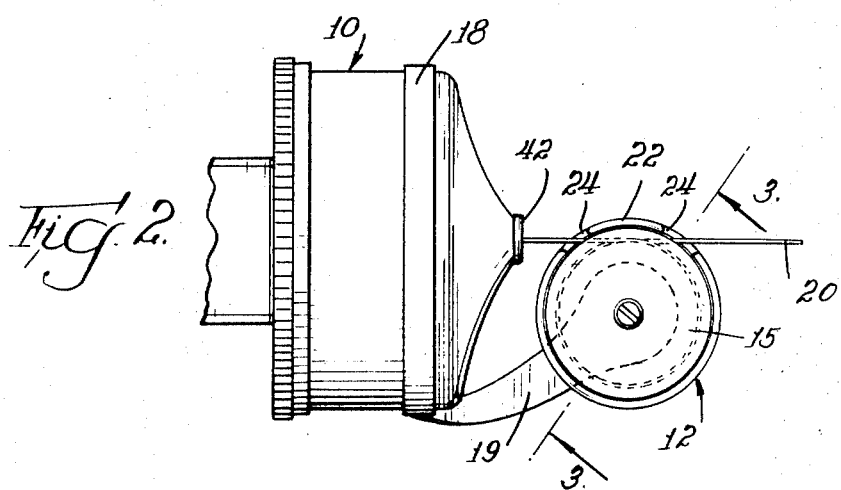
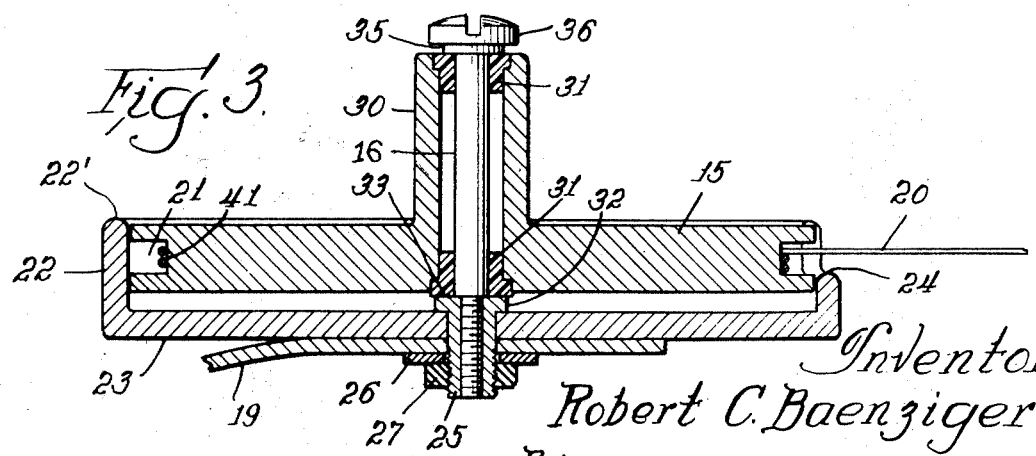
Inventor
Robert C. Baenziger
By Darbo, Robertson, & Vandenburgh
Attys.

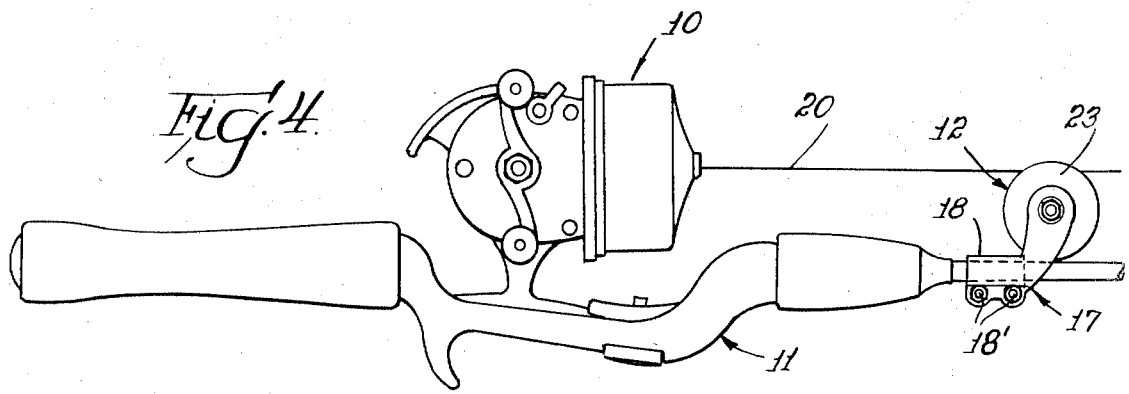
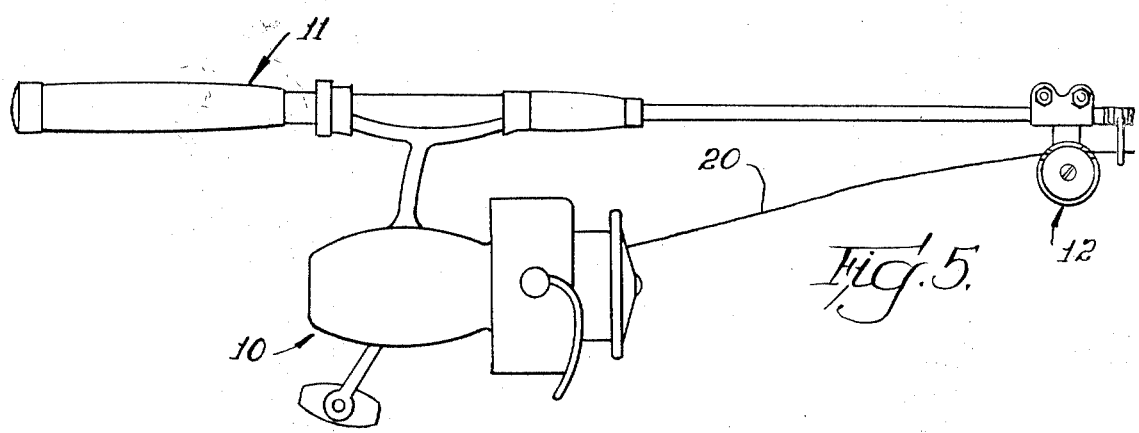
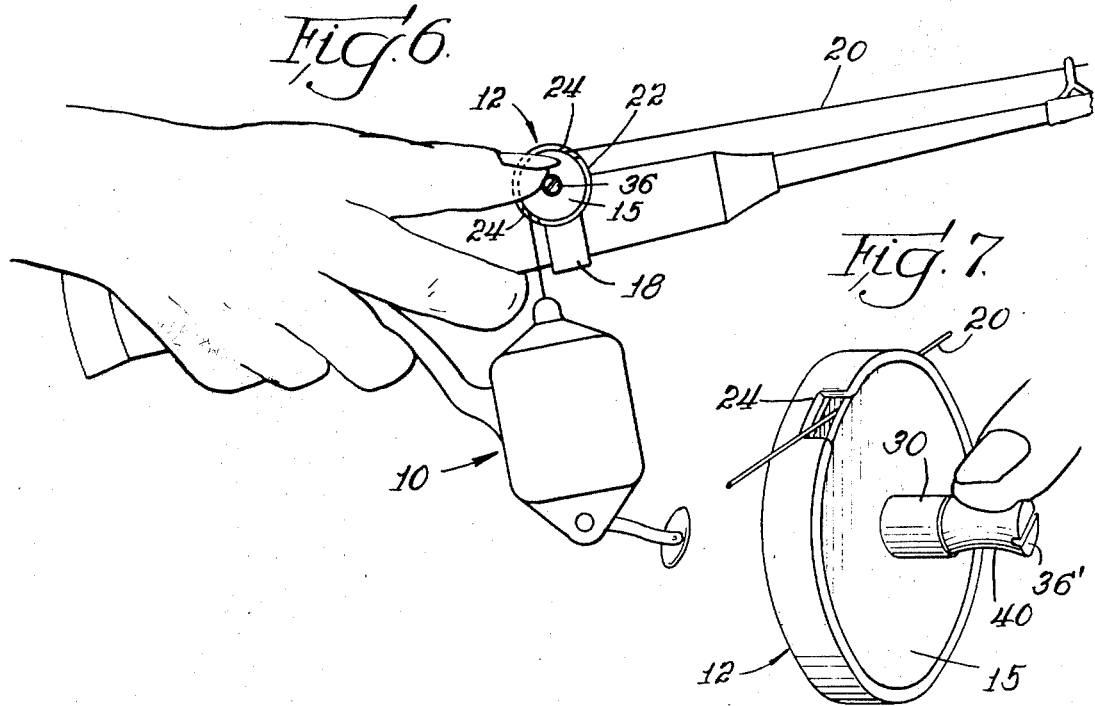

United States Patent Office 3,516,191
Patented June 23, 1970

3,516,191
FISHING FEEL WHEEL
Robert C. Baenziger, 1115 Voltz Road,
Northbrook, Ill. 60062
Filed Aug. 1, 1968, Ser. No. 749,402
Int. Cl. A01k 87/00
U.S. Cl. 43—25                                11 Claims

ABSTRACT OF THE DISCLOSURE

A freewheeling flywheel around which is wound a few turns of fishing line from a fishing reel is mounted on a fishing rod between the reel and the forward end of the rod to give stationary-spool casting rigs, such as spin-casting rigs or spinning rigs considerable "feel" as to where the bait is going and to consistently cast longer distances. Circumferential enclosure means is disposed around the flywheel and has openings therein for axial passage of line from the reel to and from the flywheel for tangential winding and unwinding. The flywheel is mounted for freewheeling rotation and touching the flywheel or a projecting hub thereon with the finger while the bait is in flight provides subtle feathering to help increase accuracy of cast. As soon as the line payout stops the elasticity of the line causes it to loosen around the flywheel with the result that the continued spinning of the flywheel has no effect on the line payout.

BACKGROUND OF THE INVENTION

This invention relates to a device for improving the performance of casting rigs for fishermen. Presently the three most commonly used types of casting rigs are bait-casting, spin-casting, and spinning rigs. The bait-casting rigs usually involve a reel which utilizes a revolving spool on which the fishing line is wound and unwound tangentially. The spinning and spin-casting rigs utilize a reel which employs a stationary line-storage spool. In the latter-mentioned reels the fishing line is stored on the stationary spool as a result of feeding the line axially around one end of the spool, and the line is taken off the spool axially, i.e. over one end of the spool while the spool is stationary. One of the main disadvantages of the stationary-spool rig is that its very efficiency in terms of line payout causes the fisherman to be unable to feel in the rod any sense of direction in which the cast bait is flying. Very commonly, immediately after a cast is made the feel which the fisherman experiences in holding the spin cast and sometimes the spinning rods is simply that he is holding a rod in which line is paying out with no indication in the rod of any tensions in any direction. Consequently, it would be highly desirable to provide some means for restoring the "feel" which is lost to casting fishermen as a result of their use of reels which employ stationary spools, e.g. the spin-casting reels. Another problem encountered in the use of most reels which employ the stationary spool is the fact that it is usually difficult to exert controlled subtle pressures on the line for the purpose of "feathering" the plug or bait to its target. While some reels employ some type of feathering device such as a spring-controlled pin which the line spirals against, the most commonly available reels utilize non-feathering buttons which require the user to more or less "bump" the line to a corrected speed or trajectory. One of the disadvantages of the latter control devices is the fact that it involves virtually an all or nothing at all, stop-go pressure on the line. Thus, if the angler senses that his bait is about to overshoot the target and go into overhanging trees the sudden stopping of the payout with such latter-mentioned devices very often simply causes the flying bait to stretch the relatively elastic line such as the monofilament line to the extent that the flying bait not only stops, but then snaps back far short of the target. Thus, it is highly desirable to provide means for feathering the line by which the angler can exert a considerable finesse in his reducing the speed of the line payout.

A problem commonly encountered with relatively inexperienced anglers is the high-arcing cast. This cast which relatively inexperienced anglers believe is necessary in order to obtain maximum distance causes a "ballooning" of the line trailing behind the high arcing trajectory of the bait. As a result of the "ballooning" an excessively long line is exposed, and even relatively slight breezes act on the flying bait to diminish the accuracy of such casts. Thus, it is highly desirable to provide a device which enables relatively inexperienced anglers to obtain long distance casts using a relatively low trajectory with corresponding decreased ballooning and decrease in the excess line payout.

Another problem of relatively less importance is the fact that the line should be maintained in at least a slightly taut condition from the onset of the rewinding of the line on the reel. Slack coils of line will tangle on stationary spool reels, e.g. on a spinning wheel. Thus, it is highly desirable to maintain sufficient tautness on the line being rewound from the very onset to remove slack coils therefrom.

SUMMARY OF THE INVENTION

The above-mentioned desirable features are provided in accordance with this invention by adding to the fishing rig a device in accordance with this invention; namely a freewheeling flywheel-like spool around which the fishing line is wound one or more times, the line-retaining portion of said spool being enclosed by a housing sufficient to retain the line within the line-storage portion of the spool, said housing having a sufficient number of openings therein to permit the line to be introduced and discharged from the spool-storage portion. In accordance with a preferred embodiment of this invention, the wheel is mounted on one side only and held in its mounting by low friction quick release mechanism by which the wheel can be moved from within the line-retaining enclosure and the fishing line can be wound or removed from the spool conveniently. In another preferred embodiment of this invention, the flywheel is mounted on a stationary axle and is retained in position by an enlarged head portion of the axle which is adapted for resting a digit thereon whereby the angler can rotate his digit slightly to bring it into gentle contact with a portion of the spinning wheel during the flight of the bait. In an even more preferred arrangement, the stationary finger seat on the axle head lies adjacent to a reduced diameter hub-like projection from the exposed side wall of the wheel of this invention.

DESIGNATION OF THE FIGURES

FIG. 1 is a frontal view of a portion of a spin-casting rig utilizing an embodiment of this invention;

FIG. 2 is a partial top view of a spin-casting rig illustrated in FIG. 1;

FIG. 3 is an enlarged partially cross-sectional view of the flywheel and related structures of this invention taken approximately along the line 3—3 in FIG. 2;

FIG. 4 is an elevational view of a spin-casting rig utilizing a device in accordance with this invention in which the device is attached to the rod directly;

FIG. 5 is a reduced scale elevational view of a portion of a spinning rig, using an open-faced spinning reel, in which a device of this invention is attached directly to the rod between the open-faced reel and the first line guide;

FIG. 6 is an elevational view showing a casting rig utilizing a closed-face spinning type reel positioned below the handle directed upwardly in a position which enables the angler to conveniently feather the device of this invention; and FIG. 7 is a fragmentary perspective view illustrating a preferred embodiment utilizing a flattened axle head adapted for resting a finger thereon to provide more precise feathering of the line.

DESCRIPTION OF THE PREFERRED EMBODIMENT

Although the following disclosure offered for public dissemination, in return for the grant of a patent, is detailed to ensure adequacy and aid understanding, this is not intended to prejudice that purpose of a patent which is to cover each new inventive concept therein no matter how others may later disguise it by variations in form or additions or further improvements.

In the accompanying drawings, several types of fishing reels, generally 10, and fishing rods, generally 11, are shown. The details of the construction of these elements will not be discussed herein insofar as these details do not constitute part of the present invention. The device, generally 12, can be utilized as an attachment or improvement in the reel 10, or as an attachment fixed to the rod 11. In accordance with this invention, a flywheel, or free-wheeling spool 15 is rotatably mounted on an axle 16 which is maintained in substantially constant axis with respect to the other components in the casting rig by means of the mounting means 17 which may include an element-encircling band or portion 18 and a supporting arm 19. While such element-encircling portions 18 of such mounting means 17 may be compression fit as illustrated in FIG. 1, it is preferred that the element-encircling portion 18 be more securely fastened, e.g. by clamping bolts 18'. Also, the device 12 can be mounted as an integral part of reel 10.

A few turns of fishing line 20 is retained in the line-storage groove 21 by the closely fitting line-retaining means, or side wall 22 of partial housing 23. Side wall 22 has at least two openings 24 therein which permit line 20 to pass to and be wound tangentially around spool 15 and be removed tangentially therefrom as well. It is preferred that the openings 24 be slots which extend to the extreme, exposed edge 22' of side wall 22. Openings 24 obviously must be placed in appropriate locations whether the line direction on discharge is the same as its direction upon entry as illustrated in FIG. 2, or the line direction on discharge from the spool of this invention is in a substantially different direction than the direction in which it is fed to spool 15, as illustrated in FIG. 6.

In a preferred embodiment, spool 15 has a reduced diameter portion or hub 30 extending from an exposed side of the spool. Axle 16 preferably passes through the center of the entire hub and spool, the rotatable element being supported by suitable bearing means 31 and being retained in its position as a result of abutment between the inner bearing means and a low-friction elevated shoulder 32 at line 33 and by abutment at the outer extreme between the outer bearing means and shoulder 35 below the enlarged head 36 of axle 16. In the preferred embodiment illustrated in FIG. 7 the head 36' is an elongated structure having a curved circumference 40 adapted for resting a finger thereon.

It is to be understood that the configuration employing this invention need not be limited to the particular arrangements illustrated in the attached drawings, and the only limitation in the arrangement being that the line be fed tangentially to spool 15 and be removed tangentially therefrom as well. Hence, spool 15 can be positioned so that the circumference of the bottom 41 of line-retaining portion 21 be substantially in a straight line between the reel discharge opening 42 and the first guide through which the line passes, as is suggested in FIGS. 1 and 4 of the attached drawings. In an alternative configuration, spool 15 may be positioned to receive line coming from a reel at right angles to the rod, or to receive line passing rearwardly toward the handle end of the rod, from the reel thence around spool 15 and tangentially from spool 15 over the rod toward the first guide on the rod. It will be appreciated by those skilled in the art that many other configurations are entirely practical as well.

While the dimensions of the device of this invention can vary considerably, there appears to be an optimum relationship between diameter and thickness for optimum performance. For example, in embodiments in which the thickness (i.e. distance between external sides of the wheel 15) is 3/16", aluminum wheels having diameters of 1/2" or less show a very slight advantageous result, while aluminum wheels having diameters greater than 1 1/4" more preferably around 1 3/4", give best results. Equivalent results were found in aluminum wheels having 3/8" thickness at about 1 1/4" diameter. Hence, it appeared that in heavier wheels, narrower diameters give results which were equivalent to those found using larger diameter, thinner wheels. The wheels or spools 15 may be fabricated from any material having durability and permanence such as metal, plastic, etc.

OPERATION

After the device 12 of this invention is secured to the casting rig, spool 15 can be loosened to move laterally by threading axle 16 partially out of its threaded engagement with hollow bolt 25, thereby permitting the line-storage portion 21 to be moved clear of the line-retaining side wall 22. Hence, there is no need with this arrangement to remove line 20 from the rig, or to remove wheel 15 from the device; but instead the line can be directly wound once or twice or even three or four times around the line storage portion of spool 15. I prefer that line 20 be wound two or three times around spool 15. More than found winds give no improvement in operation and may lessen performance. Under no circumstances should line be wound enough to lay over line on spool 15. After care is taken to have the entering and discharge portion of the line be aligned over openings 24 in line-retaining side wall 22, spool 15 is then moved back within the encirclement of side wall 22, after which axle head 36 is threaded until tight abutment again occurs at 33. At this time axle 16 becomes stationary. I prefer that threads-securing axle 16 be tightened by rotation in the direction in which the wheel rotates during the flight of the bait.

When a cast is made, line 20 is drawn out of the reel 10 as a result of the centrifugal forces on, and resulting momentum of, the bait. However, I am unable to provide a theoretical explanation which is satisfactory to me as to the precise physical principles which adequately explain the performance of the device of this invention. As a result of repeated testing with various sizes and shapes of wheels and with various casting rigs, I have found that the device of this invention restores or imparts much of the "feel" which is experienced with bait-casting rigs, i.e. rigs using rotating spool reels, to spinning and spin-casting rigs, i.e. to rigs using stationary-spool reels. While I do not want to be bound by any theories, it is my belief, based on repeated observation, that the line between the device of this invention and the end of the rod remains slightly taut, i.e. slightly more taut than a line fed directly from the spool. This in turn appears to generate minute flexing forces on the rod, at least while the bait is in the initial stages of its trajectory following the actual cast flexing. It is my belief that these minute forces exerted upon the rod are responsible for the "feel" which enables a sportsman using a rig employing the device of this invention to have a "feel" for the location of the moving bait even though it is not visible to him in the first part of its trajectory. It is my further observation that relatively inexperience anglers using the device of this invention make long distance casts at a substantially lower arc and with substantially less payout of line during the trajectory.

I have further observed that these benefits are achieved at no expense in distance. For example, I have found that using heavy weights, e.g. ⅝ ounce bait, the distance of the cast can be increased generally from 10 to 25 percent using conventional spin cast equipment with relatively heavy weights. On the other hand when relatively light-weight bait is employed, e.g. a quarter ounce or less, the increase in distance is more dramatic. For example, using a quarter ounce bait under atmospheric conditions in which an approximately 40 foot cast was maximum without the device of this invention, casts between 60 and 65 feet were consistently made under the same conditions after attachment of the device of this invention with the same rig. Hence, I believe that the device of this invention will probably be of greatest value to sportsmen in terms of increasing distance of cast in the areas of light tackle casting and in the areas of salt-water surf casting in which substantially heavier weights are used and in which sheer distance of cast is an important consideration.

I have also found that as the speed of the bait slows down to such an extent that the line exerts less and less pressure on spinning wheel 15, the inherent flexibility and elasticity of the line causes the line to loosen within line-retaining portion 21 to the extent that immediately before or at the time at which the bait movement stops, the line has loosened around spool 15 to the extent that spool 15 continues to spin without detectable effect on the line 20.

Also, I believe the friction caused by the loose line bearing against line-retaining element 22 stops the continued payout of the line, thereby preventing the presence of loose coils ahead of the reel. The line-retaining means are also necessary to assure refeeding of loosened line around the wheel back into the line-storing portion of the flywheel 15. The loosening of coils around the wheel is so pronounced line would have a tendency to wrap around off the spool upon rewinding, absent the retaining means.

The presence of the device of this invention leads to the elimination of problems caused by loose line being rewound onto the spool insofar as the line being rewound must be pulled taut enough to grip wheel 15, in which case it causes wheel 15 to rotate. Thus, the line being rewound onto the fishing reel spool is maintained at a slight degree of tautness from almost the first moments of rewinding thereby substantially eliminating the problems encountered in rewinding of loose line onto the reels.

Also, the device of this invention assists the sportsman in controlling the speed of his bait in its trajectory by enabling him to ride his finger or thumb gently against a side wall or hub of wheel 15 of this invention. As indicated above, it is preferred that the stationary head 36 be enlarged to permit the sportsman to locate it blindly and rest his finger thereon, and yet bring part of his finger to bear gently against a portion of the hub when desired. This permits the sportsman to reduce the speed of the cast bait in its trajectory with considerable finesse and virtually eliminate the need for bumping of the line. Moreover, the use of the enlarged head portion 36 permits the sportsman to let his finger blunder against the stationary head portion and yet gently locate the spinning hub without taking his eyes from the flying bait or the target.

It will be appreciated that the device of this invention can be used by beginner and experience angler alike, and that its use requires only a slight adjustment in technique for the experience sportsman. The timing at which the bait is released during the casting motion will undoubtedly be slightly different for unimproved devices than the timing on rigs in which the device of this invention is employed. However, the need for precise timing is not so critical when the device of this invention is employed. Thus, if the bait is released at such a moment in which it would overshoot the target the angler can compensate readily by the convenient and relatively fine feathering of the line which this invention makes possible to obtain increased accuracy in his cast.

I have also tested the device of this invention on bait-casting rigs to some extent and find that no adverse effects are encountered, though the beneficial effects are less pronounced when the device of this invention is used on a bait-cast rig.

Therefore, I claim:

1. In a casting rig of rod, reel, and line, the rod having the reel attached thereto near one end thereof, and having line guide means attached near the other end thereof, the improvement comprising: a flywheel having a line storage portion around the circumference thereof, circumferential enclosure means for retaining line at the line storage portion, said circumferential enclosure means having openings therein for axial passage of line to and from the flywheel for tangential winding and unwinding, bearing means for providing freewheeling rotation of the flywheel, mounting means for supporting the bearing means on the rod, and for maintaining the axis of rotation of the flywheel fixed and substantially perpendicular with respect to the axis of the line, said flywheel being fixed to said rod at a position to receive tangentially line from the reel, and to discharge tangentially line to said guide means, a running loop of said line passing around said line storage portion.

2. An apparatus of claim 1 in which said flywheel rotates around an axle supported at only one side of the wheel, and having one side of the wheel exposed.

3. An apparatus of claim 1 in which the flywheel rotates around an axle which is supported at only one side of the wheel, and which includes means for shifting the relative position of the wheel and circumferential enclosure means whereby the wheel clears the circumferential enclosure means sufficiently for winding of line around the wheel without removing the wheel from its axle, and in which apparatus said openings in the circumferential enclosure means are slots therein which run to an exposed edge of the enclosing means.

4. In a casting rig of rod, reel, and line, the reel being attached to the rod near one end thereof, comprising: a flywheel attached to the rig between said reel and the other end of the rod, said flywheel having a line storage portion around the circumference thereof, circumferential enclosure means for retaining line at the line storage portion, said circumferential enclosure means having openings therein for axial passage of line from said reel to and from the flywheel for tangential winding and unwinding, bearing means for providing freewheeling rotation of the flywheel, mounting means for supporting the bearing means on the rig, and for maintaining the axis of rotation of the flywheel fixed and substantially perpendicular with respect to the axis of the line, one side of said wheel being exposed and accessible to receive finger pressure thereon.

5. In a casting rig of rod, reel, and line, said rig including line-guide means near an end of said rod, the improvement comprising: a flywheel attached to said rig between said reel and said guide means, said flywheel having a line storage portion around the circumference thereof, a portion of a side of said flywheel being exposed to receive finger pressure; circumferential enclosure means for retaining line at the line storage portion, said circumferential enclosure means having openings therein for axial passage of line from said reel to and from the flywheel for tangential winding and unwinding therefrom; bearing means for providing freewheeling rotation of the flywheel; stationary axle means supported at one end thereof; mounting means for supporting the axle means on the rig, and for maintaining the axis of rotation of the flywheel substantially fixed perpendicularly with respect to an axis of the line; said flywheel being rotatably supported on said stationary axle means which is supported at one end thereof, thereby providing an unsupported exposed axle end, and an exposed portion of said flywheel; said axle means having an enlarged wheel-retaining portion at the exposed end thereof, said enlarged portion being adapted for resting a finger thereon, whereby a finger can be gently brought to bear on the exposed portion of the rotatable flywheel while at rest on the enlarged end portion of said axle means.

6. In an improved casting rig including a casting rod, an axial-discharge, stationary-spool reel, and a fishing line, the improvement in which there is attached to the rod near the handle end of the rod an apparatus comprising: a flywheel having a line storage portion around the circumference thereof, circumferential enclosure means for retaining line at the line storage portion, said circumferential enclosure means having openings therein for axial passage of line from said reel to and from the flywheel for tangential winding and unwinding therefrom, bearing means for providing freewheeling rotation of the flywheel, mounting means for supporting the bearing means on the rod, and for maintaining an axis of rotation of the flywheel substantially fixed perpendicularly with respect to the axis of the line, said line being wound around said flywheel in said line storage portion thereof from one to four times.

7. In a stationary-spool, axial-discharge fishing reel device for use in a fishing rig, said device including a stationary line storage spool, the improvement in which said fishing reel device includes: a flywheel having a line storage portion around the circumference thereof, circumferential enclosure means for retaining line at the line storage portion, said circumferential enclosure means having openings therein for axial passage of line to and from the flywheel for tangential winding and unwinding, bearing means for providing freewheeling rotation of the flywheel, support means for supporting the flywheel and bearing means, and for maintaining the axis of rotation of the flywheel substantially fixed perpendicularly to the axis of the unwound line; means for tangentially feeding a running loop of line from said spool to said flywheel.

8. The reel of claim 7 in which said wheel is rotatable around stationary axle means supported at one end thereof, and in which the unsupported end of the axle is exposed, at least a portion of said flywheel being exposed adjacent the exposed axle means end, said axle means having an enlarged wheel-retaining portion at the exposed end thereof, said enlarged wheel-retaining portion being adapted for resting a finger thereon.

9. The reel of claim 7 in which said flywheel rotates around a stationary axle which is supported at only one side of the wheel, and which includes means for shifting the relative position of the circumferential enclosing means with respect to the line storage portion of the flywheel, to expose the line storage portion for winding of line around the wheel without removing the wheel from its axle, and in which said openings in the circumferential enclosure means are slots which run to an exposed edge of the enclosing means.

10. An apparatus for use on a casting rig of rod, reel, and line, comprising: a flywheel having a line storage portion around the circumference thereof, circumferential enclosure means for retaining line at the line storage portion, said circumferential enclosure means having openings therein for axial passage of line from said reel to and from the flywheel for tangential winding and unwinding, bearing means for providing freewheeling rotation of the flywheel, mounting means for supporting the bearing means on the rig, and for maintaining the axis of rotation of the flywheel fixed and substantially perpendicular with respect to the axis of the line, one side of said wheel being exposed and accessible to receive pressure thereon, said flywheel having a narrow radius hub extending from the exposed side of the flywheel.

11. An apparatus for use on a casting rig of rod, reel, and line, comprising: a flywheel having a line storage portion around the circumference thereof a portion of a side of said flywheel being exposed to receive finger pressure; circumferential enclosure means for retaining line at the line storage portion, said circumferential enclosure means having openings therein for axial passage of line from said reel to and from the flywheel for tangential winding and unwinding therefrom; bearing means for providing freewheeling rotation of the flywheel; stationary axle means supported at one end thereof; mounting means for supporting the axle means on the rig, and for maintaining the axis of rotation of the flywheel substantially fixed perpendicularly with respect to an axis of the line; said flywheel being rotatably supported on said stationary axle means which is supported at one end thereof, thereby providing an unsupported exposed axle end, and an exposed portion of said flywheel; said axle means having an enlarged wheel-retaining portion at the exposed end thereof, said enlarged portion being adapted for resting a finger thereon, whereby a finger can be gently brought to bear on the exposed portion of the rotatable flywheel while at rest on the enlarged end portion of said axle means, said flywheel including a narrow radius hub extending from the exposed side of the flywheel, between the side of said flywheel and said enlarged wheel-retaining portion.

References Cited

UNITED STATES PATENTS

| 3,034,246 | 5/1962 | Davidson | 43—20 X |
| 3,084,885 | 4/1963 | Hornbostel | 43—20 X |

FOREIGN PATENTS

| 8,765 | 1895 | Great Britain. |

SAMUEL KOREN, Primary Examiner

D. J. LEACH, Assistant Examiner

U.S. Cl. X.R.

43—22; 242—84.1, 84.53

UNITED STATES PATENT OFFICE
CERTIFICATE OF CORRECTION

Patent No. 3,516,191        Dated June 23, 1970

Inventor(s) Robert C. Baenziger

It is certified that error appears in the above-identified patent and that said Letters Patent are hereby corrected as shown below:

Column 2, line 67 "whch" should be --which--

Column 4, line 37, "found" should be --four--

Column 4, line 74, "inexperience" should be --inexperienced--

Column 5, line 69, "experience" should be --experienced--

Column 5, line 71, "experience" should be --experienced--

SIGNED AND
SEALED
OCT 20 1970

(SEAL)
Attest:

Edward M. Fletcher, Jr.
Attesting Officer

WILLIAM E. SCHUYLER, JR.
Commissioner of Patents